Feb. 17, 1959 C. W. HOLLAND, JR 2,873,847
CONVEYOR BELT CLEANER
Filed May 23, 1956 2 Sheets-Sheet 2
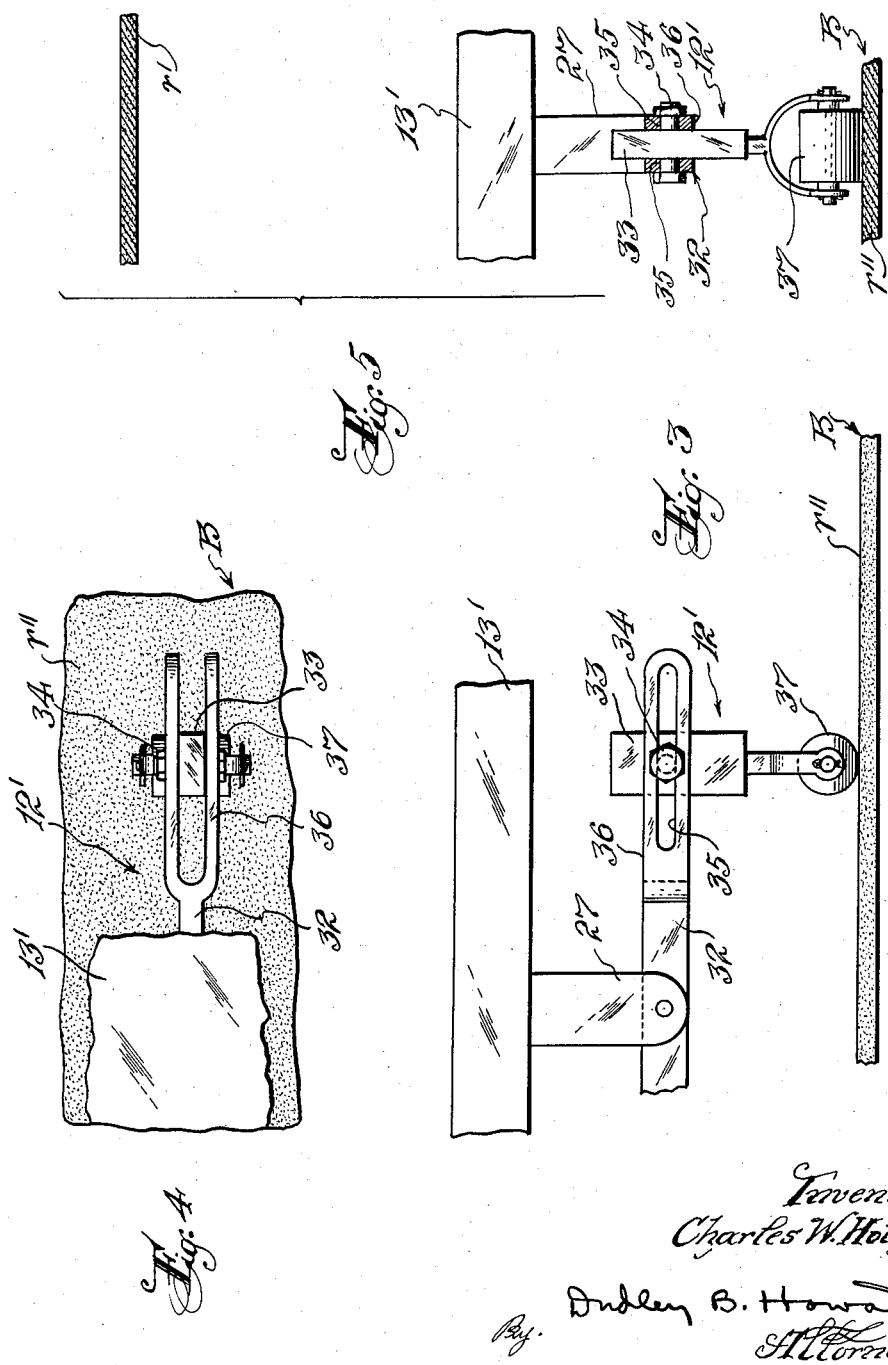

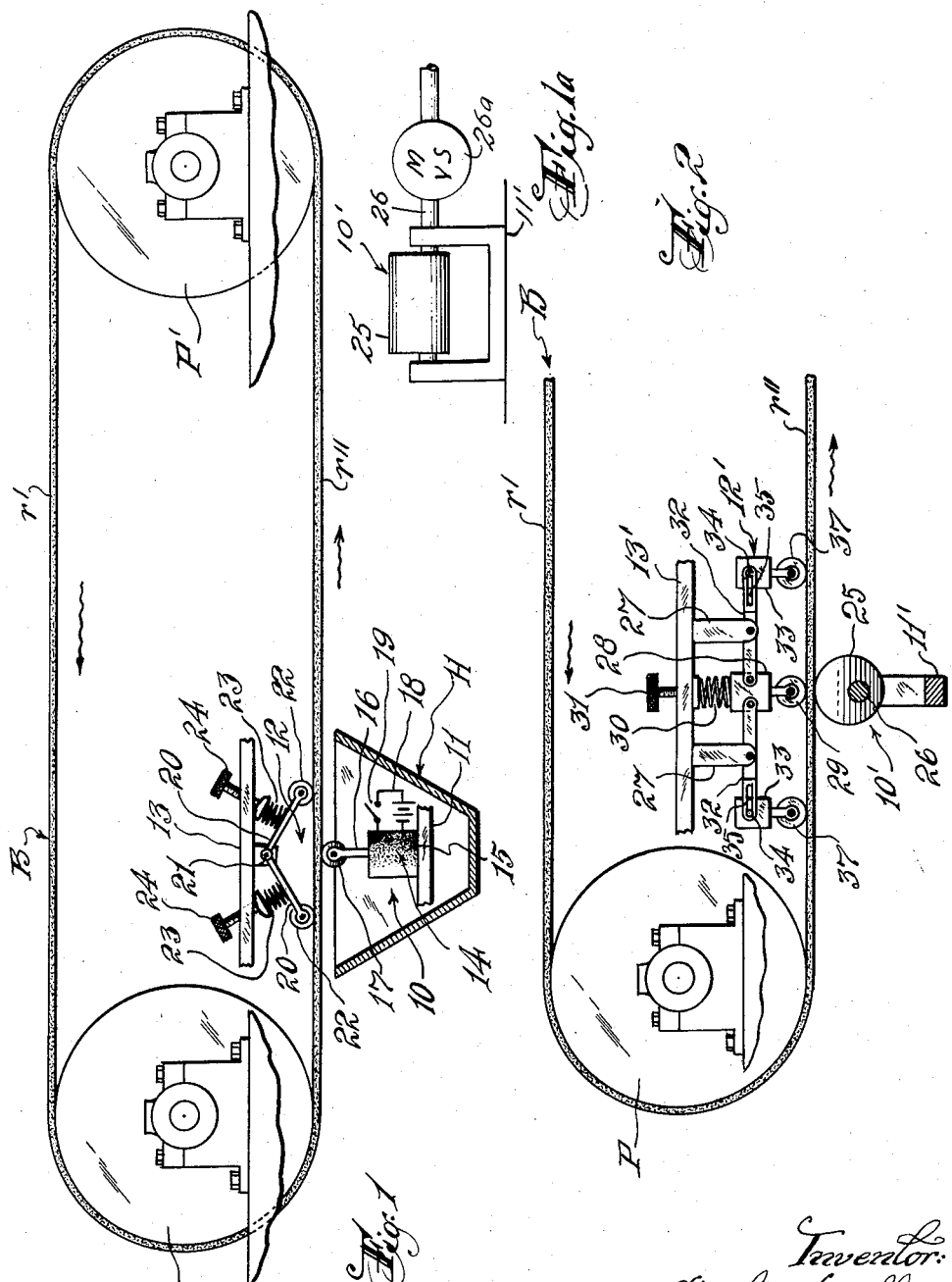

United States Patent Office 2,873,847
Patented Feb. 17, 1959

2,873,847
CONVEYOR BELT CLEANER

Charles W. Holland, Jr., Hanover, N. J.

Application May 23, 1956, Serial No. 586,834

10 Claims. (Cl. 198—230)

The invention relates to devices for cleaning conveyor belts that are used to transport pulverulent material, such as coal, which becomes partially pulverized in transit and leaves an adherent coating on the lower return run of the belt.

The adherence of a coating of dust-like particles to a conveyor belt is objectionable for at least two reasons. In the first place, some of the particles of foreign material become embedded in the interstices or pores of the belt and cause physical deterioration of the latter. Then too, a large proportion of the coating particles become separated progressively from the lower belt run and fall to the floor, thereby leaving an undesirable and unsightly deposit beneath the entire length of the belt. To remove this deposit requires continual labor with shovels, brooms, and other implements, at considerable expense.

Prior to my present invention, numerous belt cleaners have been devised in an endeavor to remove the adhered coating from the conveyor belt at the near end of its lower run for deposit in a collection hopper located at this point. These prior art belt cleaners are far from being satisfactorily efficient, however, because they are designed to beat or scrape only the underneath surface of the lower belt run. As a result, belt penetration by the adhered particles is aggravated rather than being decreased.

It, therefore, is the primary object of my present invention to supplement positive agitating means for beating against the underneath surface of a conveyor belt by cooperative reactional agitating means applied to the upper surface of the belt, whereby particles of adhered material loosened by the first-mentioned agitating means will be driven back out of the belt interstices or pores by the last-mentioned agitating means.

Another object of the invention is to provide reactional agitating means whose vibratory motion is induced by the energy of the positive agitating means.

A still further object is to provide reactional agitating means of such construction and operative relationship to the positive agitating means that the vibrational waves set up in the lower belt run by the last-mentioned means will be damped out rapidly as they progress from the area of their creation, whereby any whipping action of the belt will be prevented.

Other objects, advantages and features of the invention will become apparent as the following specific description is read in connection with the accompanying drawings, in which:

Fig. 1 is a fragmentary, semi-diagrammatic side elevational view of a typical conveyor belt having one embodiment of my invention applied thereto.

Fig. 2 is a similar view showing a modified form of belt cleaner; Fig. 1a is a fragmentary side elevation of the positive agitating means; Fig. 3 is a detail side elevation, on an enlarged scale, of a portion of the modified reactional agitating means; Fig. 4 is a plan view of the same; and Fig. 5 is an end elevation thereof.

Referring now in detail to the drawings, wherein like reference characters designate corresponding parts in the several views, the letter B indicates a typical conveyor belt mounted on terminal pulleys P and P', of which at least one is driven by a suitable prime mover (not shown) to operate the belt in the direction of the arrows.

When a conveyor belt, such as belt B in the drawings, is employed to convey from one point to another, at the same or different levels, a continuous load of any desired material, the said load is deposited on the upper run $r'$ of said belt near pulley P' and will be transported to a point of discharge in the vicinity of pulley P. If the load contains a material possessing adherent properties, such as pulverized rock or coal, or the like, a considerable quantity of the material will adhere to the belt and continue beyond the discharge point along the lower run $r''$ thereof. This action is objectionable for the reasons previously stated herein.

In accordance with the present invention, I have provided a collector hopper H beneath the near end of lower run $r''$ of conveyor belt B (considering the direction of travel) and have applied agitating mechanism to said lower run of the belt directly above hopper H in order that adhered particles of the load may be shaken loose and caused to drop into the hopper instead of being carried further. One embodiment of the belt agitating mechanism is represented in Fig. 1 and a modification thereof in Figs. 2 to 5.

In Fig. 1, the belt agitating mechanism is shown as being divided into two cooperative components, viz: positive agitating means 10 mounted on a suitable supporting structure 11 beneath the lower run $r''$ of conveyor belt B and a second reactional agitating means 12 mounted on supporting structure 13 above the said belt run. Positive agitating means 10 includes an impulse generator 14, which may be of any desired type, either mechanical, electrical, or pneumatic within the scope of the invention. There are numerous types of vibratory impulse generators available for my intended use and I do not claim to have invented a new impulse generator per se. Therefore, for illustration in the embodiment of the invention disclosed in Fig. 1, I have chosen an electrical impulse generator and have represented the same in conventional manner only. In this illustration, generator 14 comprises a housing 15 in which the vibratory mechanism is concealed. An operating stem 16 projects upwardly from the concealed mechanism and protrudes through the top of housing 15 as shown. Operating stem 16 serves to impart vibrational impulses to the lower run $r''$ of belt B, so, in order to reduce the friction, a roller 17 is journaled in suitable bearings on the upper end of said stem for rolling contact with the underneath surface of the belt. As in the structural details of impulse generator 14, considerable latitude is permissible in choice of the design features of construction of bearing means for anti-friction roller 17, so it will be continued to resort to conventional, or semi-diagrammatic, illustration of these bearing means and various other machine elements constituting the present invention. In this connection, it may be remarked that an important requirement in designing the movable parts and adjustment features of an invention of this nature, which is subjected to intentionally violent vibration in use, is to simplify the construction in such a manner that loosening of parts will occur very infrequently. In this way, excessive maintenance work and expense will be avoided.

Since the impulse generator chosen for illustration in connection with the Fig. 1 embodiment of the invention is one of the electrical type, it is shown as having a power circuit 18 controlled by switching means 19.

The reactional agitating means 12 shown in Fig. 1 may take various structural forms, but is semi-diagrammatically represented as comprising spring-loaded impact members in the form of lever arms 20—20 that are pivotally connected to supporting structure 13 as at 21 directly above anti-friction roller 17 of positive agitating means 10. The free ends of lever arms 20—20 are provided with suitably journaled anti-friction rollers 22—22 for bearing contact with the upper surface of lower run r'' of belt B at points horizontally spaced on opposite sides of the bearing contact of roller 17 with the lower surface thereof. The spring-loading means for lever arms 20—20 may be of any suitable construction, but are conventionally represented as being coiled compression springs 23—23 having manually operable screw means 24—24, respectively, by which their tension may be regulated individually and in mutual coordination for purposes which will appear presently.

In the operational use of the belt cleaner illustrated in Fig. 1, when impulse generator 14 is started to vibrate by the closing of switching means 19, positive agitating vibrations will be imparted to conveyor belt B through the medium of roller 17. Resulting vibration of belt B will induce reactional vibrations in reactional agitating means 12, as constituted by lever arms 20—20, rollers 22—22, and springs 23—23. In other words, springs 23—23 will be alternately compressed and permitted to "kick back" at conveyor belt B in response to the vibrations to which the latter is subjected positively by impulse generator 14. The efficacy of the cooperative positive and reactional agitating means in detaching adhered foreign matter, such as coal dust, from belt B may be determined and subsequently improved by regulating the period of vibration of springs 23—23 in relation to the vibration period of impulse generator 14. This regulation may be accomplished by adjusting screws 24—24. Practice will determine whether springs 23—23 should vibrate in synchronism with impulse generator 14 or out of step therewith.

A further useful feature of the provision of screw means 24—24 and the staggered arrangement of rollers 22—22 of reactional agitating means 12 in relation to roller 17 of positive agitating means 10 is the ability afforded an operator to damp out belt vibration waves as they progress forwardly from the location of roller 17 of said positive agitating means. For example, springs 23—23 may be adjusted in tension differentially so as to give the spring at the left in Fig. 1 a period of vibration the same as that being imparted to belt B and then set up non-synchronous vibrations in the spring at the right.

Figs. 2 to 5 represent modified forms of both the positive agitating means and the reactional agitating means. Instead of employing an electrical impulse generator, the positive agitating means 10' of the modification is entirely mechanical in structure and mode of operation. In this instance, an impulse generating roller 25 is eccentrically affixed to a driven shaft 26 which is journaled in supporting structure 11' and operated by a prime mover 26a constituted by a variable speed motor, as conventionally represented in Fig. 1a. As roller 25 is rotated rapidly, it imparts vertical vibrations to belt B. The periodicity of these vibrations may be varied by regulating the speed of rotation of shaft 26.

The reactional agitating means 12' shown in Figs. 2 to 5 has three points of contact with conveyor belt B instead of the two points disclosed in the preceding figure of drawing. Dependent from supporting structure 13' are two fulcrum members 27—27 arranged in straddling relation to the vertical plane in which the axis of shaft 26 of positive agitating means 10' is located. In the said plane, a vertically reciprocating impact member 28 is mounted. This impact member 28 carries an anti-friction roller 29 for direct contact with the upper surface of lower run r'' of belt B. A compression spring 30 is interposed between impact member 28 and supporting structure 13' and is regulated in degree of tension by screw means 31. A pair of substantially horizontal and aligned rocker arms 32—32 are medially pivoted to the respective fulcrum members 27—27 and have their adjoining inner ends pivotally connected with slight endwise play to impact member 28. At the respective outer ends of rocker arms 32—32, vertically vibratable impact members 33—33 are attached for limited horizontal adjustment in longitudinal relation to conveyor belt B. A bolt 34 slidable in slots 35 in bifurcated yoke 36 formed at the outer end of each rocker arm 32 may be the means adopted for such horizontal adjustment to determine the distance of either impact member 33 from impact member 28. An anti-friction roller 37 is carried by each impact member 33 for direct bearing contact with the upper surface of lower run r'' of belt B.

The belt cleaner disclosed in Figs. 2 to 5 operates in a general manner similar to the cleaner shown in Fig. 1, but is improved in some respects. In the modified mechanism, roller 25 of positive agitating means 10' is directly opposed to central roller 29 of reactional agitating means 12', which makes it easier to adjust the period of vibration of roller 29 with respect to that of roller 25 when using screw means 31.

Use of rollers 37—37 selectively in damping out the vibrational waves set up in conveyor belt B in advance of the point of positive application of cleaning vibrations is facilitated and made more precisely regulable by the horizontal adjustment of each impact member 33 lengthwise on the corresponding outer end of its supporting rocker arm 32.

It will be understood that it is intended to cover all changes and modifications of the examples of the invention herein chosen for the purpose of illustration which do not constitute departures from the spirit of the invention and scope of the appended claims.

I claim:

1. A cleaner for conveyor belts comprising: a supporting structure adapted to be disposed adjacent to the lower run of a conveyor belt; positive belt agitating means supported by said supporting structure to engage the underneath surface of the lower run of the belt and impart vibrational impulses thereto; and reactional agitating means yieldably supported by said supporting structure to engage the upper surface of said lower run of the belt and being constructed and arranged to vibrate in a direction perpendicular to the belt in response to impulses transmitted thereto through the medium of said belt.

2. A cleaner for conveyor belts as defined in claim 1, wherein the reactional agitating means includes a belt impact member, and resilient means biasing said impact member into belt contact.

3. A cleaner for conveyor belts as defined in claim 2, wherein the resilient means biasing the impact member into belt contact is in the form of a compression spring interposed between the supporting structure and said impact member, and wherein adjustable means is added to said supporting member at the opposite side thereof with respect to said impact member to vary the degree of compression of said spring and regulate the period of vibration of the reactional agitating means.

4. A cleaner for conveyor belts as defined in claim 1, wherein the positive belt agitating means is an eccentric roller affixed to a rotatable shaft journaled on the supporting structure and having its peripheral face bearing against the underneath surface of the lower run of the belt, and wherein there are added a variable speed motor to operate said rotatable shaft and means by which the rotational speed of said motor may be varied, whereby the period of vibration of the positive agitating means may be regulated.

5. A cleaner for conveyor belts as defined in claim 1, wherein the reactional agitating means includes at least two impact members arranged to contact the conveyor belt at points longitudinally staggered along the conveyor belt in relation to the point of contact of the positive agitating means therewith.

6. A cleaner for conveyor belts as defined in claim 5, wherein spring-loading means is provided to bias the impact members of the reactional agitating means toward the conveyor belt.

7. A cleaner for conveyor belts as defined in claim 1, wherein the reactional agitating means includes at least two impact members arranged to contact the conveyor belt at points longitudinally staggered along the conveyor belt in relation to the point of contact of the positive agitating means therewith, and wherein means is provided to adjust the distance of each impact member of the reactional agitating means along the belt in relation to the point of impact of the positive agitating means therewith.

8. A cleaner for conveyor belts as defined in claim 1, wherein the reactional agitating means includes a pair of impact members in the form of lever arms pivotally connected to the supporting structure at a point directly above the point of contact of the positive agitating means with the conveyor belt and extending downward toward said belt in opposite directions longitudinally with respect to the latter away from their pivot, and individual spring-loading means for the respective impact members biasing them toward the belt.

9. A cleaner for conveyor belts as defined in claim 1, wherein the reactional agitating means includes a vertically movable impact member located above the lower run of the belt substantially in the vertical plane of the point of contact of the positive agitating means with the underneath surface of said belt, a single spring means biasing said impact member toward the conveyor belt, a substantially horizontal rocker arm arranged on each side of the impact member and extending longitudinally with respect to the belt and being medially pivoted to the supporting structure and having one end pivotally connected to said impact member, and an impact member carried by the free end of each rocker arm for contact with said belt.

10. A cleaner for conveyor belts as defined in claim 9, wherein each of the last-mentioned impact members is longitudinally adjustable on the corresponding rocker arm.

References Cited in the file of this patent

UNITED STATES PATENTS

| | | |
|---|---|---|
| 2,551,123 | Heller | May 1, 1951 |
| 2,647,619 | Green | Aug. 4, 1953 |

FOREIGN PATENTS

| | | |
|---|---|---|
| 532,265 | Great Britain | Jan. 21, 1941 |